US 6,602,656 B1

(12) United States Patent
Shore et al.

(10) Patent No.: US 6,602,656 B1
(45) Date of Patent: Aug. 5, 2003

(54) SILVER HALIDE IMAGING ELEMENT WITH RANDOM COLOR FILTER ARRAY

(75) Inventors: Joel D. Shore, Rochester, NY (US); Krishnan Chari, Fairport, NY (US); Dennis R. Perchak, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/225,608

(22) Filed: Aug. 22, 2002

(51) Int. Cl.[7] .............................. G02B 5/20; G03C 1/825
(52) U.S. Cl. ............................................ 430/511; 430/7
(58) Field of Search ........................................ 430/511, 7

(56) References Cited

U.S. PATENT DOCUMENTS 3,728,116 A * 4/1973 Waxman ..................... 430/222
5,998,109 A    12/1999 Hirabayashi
6,117,627 A     9/2000 Tanaka et al.
6,387,577 B2 *  5/2002 Simons ......................... 430/7

FOREIGN PATENT DOCUMENTS

JP            97145909            6/1997

* cited by examiner

Primary Examiner—John A. McPherson
(74) Attorney, Agent, or Firm—Arthur E. Kluegel (57) ABSTRACT

Disclosed is an imaging element comprising a single layer containing a random distribution of a colored bead population of one or more colors coated above one or more layers comprising light sensitive silver halide emulsion grains, wherein the population comprises beads of at least one color in which at least 25% (based on projected area) of the beads of that color have an ECD less than 2 times the ECD of the silver halide grains in said one emulsion layer or in the fastest emulsion layer in the case of more than one emulsion layer

18 Claims, 1 Drawing Sheet

SILVER HALIDE IMAGING ELEMENT WITH RANDOM COLOR FILTER ARRAY

FIELD OF THE INVENTION

This invention relates to an imaging element comprising a layer containing a random distribution of colored beads of one or more colors coated above one or more layers of silver halide emulsion grains, wherein the bead population comprises beads of at least one color in which at least 25% (based on projected area) of the beads of that color have an ECD less than 2 times the ECD of the silver halide grains either comprising said one layer or comprising the fastest layer of more than one layer.

BACKGROUND OF THE INVENTION

The great majority of color photographs today are taken using chromogenic color film in which color-forming couplers, which may be incorporated in the film or present in the processing solution, form cyan, magenta and yellow dyes by reaction with oxidized developing agent which is formed where silver halide is developed in an imagewise pattern. Such films require a development process which is carefully controlled in respect of time and temperature, which is usually followed by a silver bleaching and a fixing step, and the whole process typically takes several minutes and needs complex equipment.

Color photography by exposing a black-and-white photographic emulsion through a color filter array which is an integral part of the film or plate on which the photographic emulsion is coated, has long been known to offer certain advantages of simplicity or convenience in color photography. Thus the Autochrome process, disclosed by the Lumiere brothers in 1906 (U.S. Pat. No. 822,532) exposed the emulsion through a randomly disposed layer of red, green and blue-colored potato starch grains, and the emulsion was reversal processed to give a positive image of the scene which appeared colored when viewed by light transmitted through the plate. The process allowed the formation of a colored photograph without the chemical complexity of later photographic methods.

The Dufaycolor process (initially the Dioptichrome plate, L.Dufay, 1909) used a regular array of red, green and blue dyed patches and lines printed on a gelatin layer in conjunction with a reversal-processed black-and-white emulsion system, which similarly gave a colored image of the scene when viewed by transmitted light.

Polavision (Edwin Land and the Polaroid Corporation, 1977) was a color movie system employing a rapid and convenient reversal processing method on a black-and-white emulsion system coated above an array of red, green and blue stripes, which gave a colored projected image. It was marketed as a still color transparency system called Polachrome in 1983.

These methods suffered a number of disadvantages. The images were best viewed by passing light through the processed film or plate, and the image quality was not sufficient to allow high quality prints to be prepared from them, due to the coarse nature of the Autochrome and Dufaycolor filter arrays, and the coarse nature of the positive silver image in the Polavision and Polacolor systems. The regular array patterns were complicated and expensive to manufacture. In addition, the films which used regular or repeating filter arrays were susceptible to color aliasing when used to photograph scenes with geometrically repeating features.

U.S. Pat. No. 4,971,869 discloses a film with a regular repeating filter array which claims to be less susceptible to aliasing problems. The film comprises a panchromatic photographic emulsion and a repetitive pattern of a unit of adjacent colored cells wherein at least one of the cells is of a subtractive primary color (e.g. yellow, magenta or cyan) or is of a pastel color. Scene information can be extracted from the developed film by opto-electronic scanning methods.

U.S. Pat. No. 6,117,627 discloses a light sensitive material comprising a transparent support having thereon a silver halide emulsion layer and a randomly arranged color filter layer comprising colored resin particles. The material has layer arrangement limitations and results in increased fogging of the sensitized layer. The patent discloses the preparation of a color filter array using heat and pressure to form the color filter layer prior to application of the light sensitive layer to a support. Due to the necessary use of pressure and heat, it is not practical to use the teachings of this patent to prepare a film having a light sensitive layer between the color filter layer and the support. Attempting to apply the needed heat and pressure to bond the filter layer to the rest of the multilayer would damage the light sensitive layer. The patent also discloses exposing, processing and electro-optically scanning the resultant image in such a film and reconstructing the image by digital image processing.

Color photographic films which comprise a color filter array and a single image recording layer or layer pack have the advantage of rapid and convenient photographic processing, as the single image recording layer or layer pack can be processed rapidly without the problem of mismatching different color records if small variations occur in the process. A small change in extent of development for example will affect all color records equally. Exceptionally rapid processing is possible using simple negative black-and-white development, and if suitable developing agents are included in the coating, the photographic response can be remarkably robust or tolerant towards inadvertent variations in processing time or temperature.

Copending and commonly assigned U.S. Ser. No. 09/922,273, filed Aug. 3, 2001, the contents of which are incorporated herein by reference, discloses a color film comprising (1) a support layer, (2) a light sensitive layer, and (3) a water permeable color filter array (CFA) layer comprising a continuous phase transparent binder containing a random distribution of colored transparent beads, said beads comprising a water-immiscible synthetic polymer or copolymer.

An undesirable feature of the random color filter array in general is the introduction of noise into the imaging system due to the randomness of the array. For the purposes of illustration, consider the case of a system with three bead colors, red, green, and blue, although the ideas to be discussed hold independent of this specific embodiment. Define the average projected areal coverage of beads of each color is <r>, <g>, and <b> for red, green, and blue beads, respectively. If one considers a certain aperture size corresponding, for example, to the aperture size of a scanning device used to scan this film, then because of random fluctuations the actual areal coverages of the beads in this aperture region, r, g, and b, will not in general be exactly equal to the above average values. Rather, as the aperture is scanned over the array, the values of r, g, and b will fluctuate about the average values of <r>, <g>, and <b>. It is desirable to minimize the magnitude of these fluctuations in areal coverage.

It is well-understood from basic statistical considerations that, for a given aperture size, the noise (i.e., the magnitude of these fluctuations) will decrease as the size of all of the beads, in toto, is made smaller. However, if the system contains beads with a distribution of sizes, it is not clear to what extent reducing the size of only a portion of the beads will reduce the noise. In particular, it is not clear to what extent reducing the size of only the beads of a certain color or colors will reduce the noise. This latter question is important because manufacturability issues, such as the ability to load dye into the beads, may set a lower limit on the size of one or more colors of the beads. While reducing the noise level is a goal, it is desirable to achieve that objective without causing undesirable effects on the imaging system as a whole because, if the beads become too small relative to the underlying emulsion grains, then it is expected that the quality of the color reproduction will be sacrificed (and the noise of the imaging system as a whole may even be increased).

Japanese published application 09-145,909 discloses the use of a silver halide material as a means of placing colored filter elements on a liquid crystal display. U.S. Pat. No. 5,998,109 discloses a light sensitive silver halide material containing at least three stripe-like or mosaic layers having different spectral transmission characteristics. This patent is unclear as to how the three layers are arranged. Moreover, this patent does not address the issue of controlling the noise level of the image information. It gives broad ranges of filter and grain sizes but does not address the importance of selecting the relative sizes on the resulting noise levels.

It is a problem to be solved to provide a silver halide emulsion film employing colored beads wherein the size of the beads is selected relative to the silver halide grain size so that the noise level is reduced.

SUMMARY OF THE INVENTION

The invention provides an imaging element comprising a single layer containing a random distribution of a colored bead population of one or more colors coated above one or more layers comprising light sensitive silver halide emulsion grains, wherein the population comprises beads of at least one color in which at least 25% (based on projected area) of the beads of that color have an ECD less than 2 times the ECD of the silver halide grains in said one emulsion layer or in the fastest emulsion layer in the case of more than one emulsion layer. The invention also provides an imaging process employing the imaging element.

Embodiments of the invention provide a silver halide emulsion film employing colored beads wherein the size of the beads is selected so that the noise level is reduced.

DETAILED DESCRIPTION OF THE INVENTION

In the discussion below, we will for illustrative purposes consider the case of a film consisting of a random color filter array (CFA) containing three different color beads, specifically red, green, and blue. However, it is understood that the discussion could easily be generalized to other CFA configurations.

As used herein the following terms are as defined:

"bead" means a solid or liquid particle having a substantially curvilinear shape. Examples of beads are particles having a spheroid or ellipsoid shape. Particles with substantial edges or corners or which have been crushed, powdered or ground are not beads. The beads may comprise a polymer that is inherently colored or may contain a separate colorant.

"a color" refers to hues of "blue", "green" and "red" having maximum absorptions in the range of 400–500nm, 500–600nm, and 600–700nm, respectively.

"insoluble colorant" means a colorant, whether a pigment or a dye, that is not dissolved under either the coating conditions for making the film or the development conditions for processing the film.

"light sensitive layer" means a layer that, upon imagewise exposure to light, undergoes more or less change depending on the amount of light exposure.

"nano-particle" means a particle having an average particle size less than 0.3 microns.

"nano-particulate milled dispersion" means a nano-particle dispersion prepared by milling.

"percentage overlap" means the ratio of (the projected overlapping cross-section of overlapping beads divided by the cross-section of all beads)×100. More accurate imaging and more light sensitivity occurs when a given photon of light is filtered by only one color of bead. A high percentage overlap is therefore an undesirable feature of CFA.

"synthetic polymer" means a polymer prepared from the corresponding monomers by synthetic means as opposed to one occurring in nature, such as gelatin.

"water permeable layer" means a layer that is readily pervious to water.

The invention provides an imaging element as summarized above. The element desirably comprises beads of two or more colors or even three or more colors wherein at least two of the bead colors comprise beads in which at least 25% (based on projected area) of the beads have an ECD less than 2 times the ECD of the silver halide grains in said one emulsion layer or in the fastest emulsion layer in the case of more than one emulsion layer. Desirably, the beads may comprise three colors and the three bead colors comprise beads in which at least 25% (based on projected area) of the beads have an ECD less than 2 times the ECD of the silver halide in said one emulsion layer or in the fastest emulsion layer in the case of more than one emulsion layer. Considering all colors combined, in toto, the population may comprise beads in which at least 25% (based on projected area) of the beads have an ECD less than 2 times the ECD of the silver halide in said one emulsion layer or in the fastest emulsion layer in the case of more than one emulsion layer.

Suitably, at least 30% (based on projected area), and desirably at least 50% of the beads of the one color have an ECD less than 2 times the ECD of the silver halide grains either comprising said one layer or comprising the fastest layer of more than one layer. The film of the invention conveniently employs the desired sized beads in a green population.

The film of the invention may employ at least 50% or even at least 75% (based on projected area) of the beads of said at least one color that have an ECD of from 0.5 to 3 times or even 1 to 2 times the ECD of the silver halide grains in said one emulsion layer or in the fastest emulsion layer in the case of more than one emulsion layer.

The film of the invention desirably comprises silver halide grains in said one emulsion layer or in the fastest emulsion layer in the case of more than one emulsion layer with an ECD that is less than 3 micrometers. The film may comprise a support located on the side of the one or more layers of silver halide emulsion grains opposite from the layer containing the random population of colored beads or a support located between the one or more layers of silver halide emulsion grains and the layer containing the random population of colored beads.

The invention also provides an imaging process for forming an image comprising imagewise exposing the film of the invention and thereafter contacting the silver halide emulsion with a reducing agent to form an image. Suitably, the process includes the subsequent step of printing the image via color selective light transmission of the beads after development.

Besides the limitations above, for particular situations there may be further constraints on the size of the beads set by manufacturability issues, such as (but not limited to) the ability to load dye into the beads.

Figure 1:
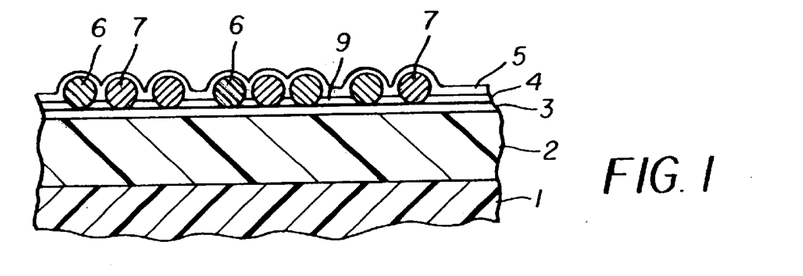
FIG. 1 is a schematic view of the layers of one embodiment of the invention.

FIG. 1 shows one embodiment useful with the film of the invention. The multilayer color film comprises support 1 bearing light sensitive layer 2, an underlayer 3, color filter array (CFA) layer 4, protective overcoat 5, the CFA layer containing transparent beads of a first color 6 and second color 7 disposed in a water permeable continuous phase transparent binder 9. The thicknesses of the layers are not to scale.

Figure 2:
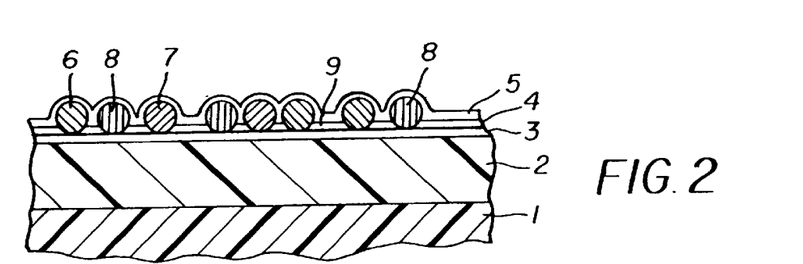
FIG. 2 is a schematic view of the layers of a second embodiment of the invention.

FIG. 2 shows a similar multilayer structure in which there are also beads 8 of a third color in layer 4.

Figure 3:
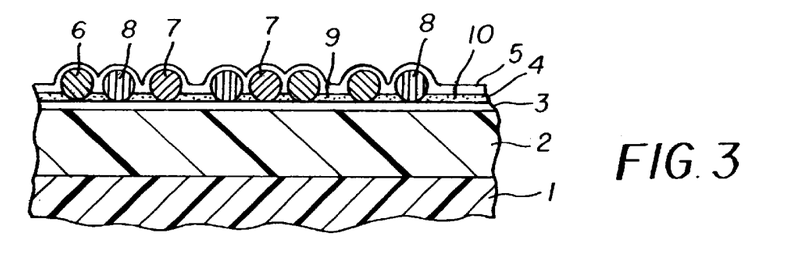
FIG. 3 is a schematic view of the layers of a third embodiment of the invention.

FIG. 3 shows a multilayer similar to that of FIG. 2 additionally containing neutral nano-particles 10 dispersed in the continuous phase transparent binder 9.

Figure 4:
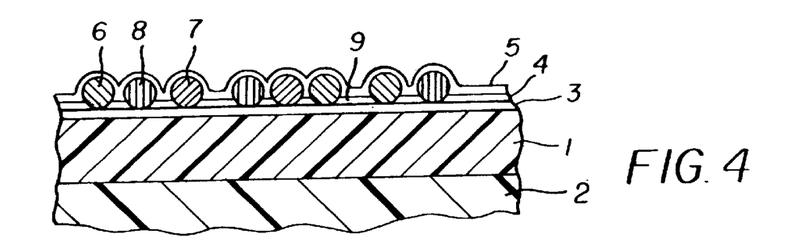
FIG. 4 is a schematic view of a film according to a fourth embodiment of the invention.

FIG. 4 shows a multilayer similar to that of FIG. 3 in which the layer order is rearranged to place layers 2 and 4 on opposite sides of the support.

The beads useful in the invention may be solid or liquid in character. They are curvilinear in shape to aid in the formation of a bead containing monolayer having a low percentage overlap (not more than 20% overlap) with color particles of other colors. They may be prepared in any manner suitable for obtaining the desired bead shape. Suitable methods are suspension and emulsion polymerization methods such as the limited coalescence technique as described by Thomas H. Whitesides and David S. Ross in "J. Colloid Interface Science" 169. 48–59 (1995).

The limited coalescence method includes the "suspension polymerization" technique and the "polymer suspension" technique. A preferred method of preparing polymer particles in accordance with this invention is by a limited coalescence technique where poly-addition polymerizable monomer or monomers are added to an aqueous medium containing a particulate suspending agent to form a discontinuous (oil droplet) phase in a continuous (water) phase. The mixture is subjected to shearing forces, by agitation, homogenization and the like to reduce the size of the droplets. After shearing is stopped, an equilibrium is reached with respect to the size of the droplets as a result of the stabilizing action of the particulate suspending agent in coating the surface of the droplets, and then polymerization is completed to form an aqueous suspension of polymer particles. This process is described in U.S. Pat. Nos. 2,932,629; 5,279,934; and 5,378,577; which are incorporated herein by reference.

In the "polymer suspension" technique, a suitable polymer is dissolved in a solvent and this solution is dispersed as fine water-immiscible liquid droplets in an aqueous solution that contains colloidal silica as a stabilizer. Equilibrium is reached and the size of the droplets is stabilized by the action of the colloidal silica coating the surface of the droplets. The solvent is removed from the droplets by evaporation or other suitable technique resulting in polymeric particles having a uniform coating thereon of colloidal silica. This process is further described in U.S. Pat. No. 4,833,060 issued May 23, 1989, incorporated by reference.

In practicing this invention using the suspension polymerization technique, any suitable monomer or monomers may be employed such as, for example, styrene, vinyl toluene, p-chlorostyrene; vinyl naphthalene; ethylenically unsaturated mono-olefins such as ethylene, propylene, butylene and isobutylene; vinyl halides such as vinyl chloride, vinyl bromide, vinyl fluoride, vinyl acetate, vinyl propionate, vinyl benzoate and vinyl butyrate; esters of alpha-methylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidone divinyl benzene, ethylene glycol dimethacrylate, mixtures thereof; and the like.

In the suspension polymerization technique, other addenda are added to the monomer droplets and to the aqueous phase of the mass in order to bring about the desired result including initiators, promoters and the like which are more particularly disclosed in U.S. Pat. Nos. 2,932,629 and 4,148,741, both of which are incorporated herein by reference.

Useful solvents for the polymer suspension process are those that dissolve the polymer, which are immiscible with water and which are readily removed from the polymer droplets such as, for example, chloromethane, dichloromethane, ethylacetate, vinyl chloride, methyl ethyl ketone, trichloromethane, carbon tetrachloride, ethylene chloride, trichloroethane, toluene, xylene, cyclohexanone, 2-nitropropane and the like. A particularly useful solvent is dichloromethane because it is a good solvent for many polymers while at the same time, it is immiscible with water. Further, its volatility is such that it can be readily removed from the discontinuous phase droplets by evaporation.

The quantities of the various ingredients and their relationship to each other in the polymer suspension process can vary over wide ranges, however, it has generally been found that the ratio of the polymer to the solvent should vary in an amount of from about 1 to about 80% by weight of the combined weight of the polymer and the solvent and that the combined weight of the polymer and the solvent should vary with respect to the quantity of water employed in an amount of from about 25 to about 50% by weight. The size and quantity of the colloidal silica stabilizer depends upon the size of the particles of the colloidal silica and also upon the size of the polymer droplet particles desired. Thus, as the size of the polymer/solvent droplets are made smaller by high shear agitation, the quantity of solid colloidal stabilizer is varied to prevent uncontrolled coalescence of the droplets and to achieve uniform size and narrow size distribution of the polymer particles that result. These techniques provide particles having a predetermined average diameter anywhere within the range of from 0.5 micrometer to about 150 micrometers with a very narrow size distribution. The coefficient of variation (ratio of the standard deviation to the average diameter, as described in U.S. Pat. No. 2,932,629) is normally in the range of about 15 to 35%.

The particular polymer employed to make the beads is a water immiscible synthetic polymer that may be colored. The preferred polymer is any amorphous water immiscible synthetic polymer. Examples of polymer types that are useful are polystyrene, poly(methyl methacrylate) or poly(butyl acrylate). Copolymers such as a copolymer of styrene and butyl acrylate may also be used. Polystyrene polymers are conveniently used. The formed beads are colored using an insoluble colorant that is a pigment or dye that is not dissolved under either the coating conditions or the development processing conditions. Suitable dyes may be oil-soluble in nature, and can be chosen for example from the classes of solvent dyes and disperse dyes listed in the Color Index, 3rd Edition, published by The Society of Dyers and Colorists, Bradford, England. Specific examples are listed under their Color Index (CI) names, and include CI Solvent Blue 14, CI Solvent Blue 35, CI Solvent Blue 63, CI Solvent Blue 79, CI Solvent Yellow 174, CI Solvent Orange 1, CI Solvent Red 19, CI Solvent Red 24, CI Disperse Yellow 3, and 4-phenylazodiphenylamine.

Suitable pigments are chosen for their properties of hue, fastness, and colorability, and can include, for example, CI Pigment Green 7, CI Pigment Green 36, CI Pigment Blue 15:3, CI Pigment Blue 60, CI Pigment Violet 23, CI Pigment Red 122, CI Pigment Red 177, CI Pigment Red 194, CI Pigment Orange 36, CI Pigment Orange 43, CI Pigment Yellow 74, CI Pigment Yellow 93, CI Pigment Yellow 110, and CI Pigment Yellow 139. When pigment particles are incorporated in the colored elements, they should be of a fine.particle size, preferably substantially less than one micrometer.

After the beads are colored, they are then randomly mixed with other beads similarly prepared but dyed a different color. The beads are desirably formed so as to have an equivalent circular diameter, when projected in a direction perpendicular to the support, of 3–15 micrometers.

The beads are conveniently dispersed in a random manner into a continuous transparent binder. The binder is any water permeable material that will permit water to pass through the layer in the development-processing phase of the imaging. Examples of suitable water permeable binders include gelatin, poly(vinyl alcohol), poly(vinyl pyrrolidone), poly(ethylene oxide), polyacrylamide, polymers based on acrylic acid or maleic acid units, and water soluble cellulose derivatives such as hydroxyethyl cellulose. Gelatin is a readily convenient source for the water permeable binder Improved quality reproductions are obtained when the binder contains an additional neutral colored particle. Such particles may range from white to black and are desirable of a mean size smaller than the beads so as to enable the particles to fill voids between the beads. Nano-particles having an average particle size in the range of 0.01 to 0.3 microns are useful for this purpose. Carbon black is one suitable composition for this nano-particle. Commercially available carbon samples (e.g., Black Pearls 280, Black Pearls 430, Black Pearls 490, Black Pearls 700, Black Pearls 880, Black Pearls 1000, Regal 250, Regal 350, and Regal 400 available from Cabot Corp.) may be obtained and milled in accordance with conventional procedures (e.g., in accordance with the milling process described in U.S. Pat. No. 5,500,331) to obtain desired dispersed particle size.

The beads in the continuous phase transparent binder may also contain a cross-linking agent but this component will desirably be less than 30 wt % of the total polymer content. The beads will typically be composed of beads of two or more colors. Three or more colors provide better color rendition in general. An additive or subtractive primary system may serve as the basis for the bead colors. Thus, either red/green/blue or cyan/magenta/yellow systems may be readily used.

Passage of processing solutions and chemicals through the CFA layer is especially important in the preferred film structure in which the CFA is located between the emulsion layers and the top coated surface of the film, that is between the emulsion layers and the processing solutions which are applied to the film, see FIGS. 1–3. This film structure is preferred because it allows the film to be exposed in the camera with the support towards the back of the camera and the emulsion side toward the lens, which is the orientation for which films and cameras are normally designed. Such a film structure is essential in the case of Advanced Photographic System films because the magnetic recording layer functions most effectively when coated on the back of the support and has to be in contact with the magnetic heads in the back of the camera. It may be desirable to provide an undercoat for the CFA layer to help control the extent of monolayer coating of the beads. It is further desirable to provide an overcoat over the CFA layer for protective purposes.

The light sensitive layer 2 may comprise one or more layers. The light sensitive portions are sensitive to light that has successfully passed through the layers above it. Thus the image information for each color record is recorded in the light sensitive layer or emulsion layer unit. The layers may be of differing light sensitivities or speeds. Photographic addenda known in the art, such as antifoggants and speed-increasing agents may be present in or adjacent to the layer(s) 3. Substances such as developing agents, blocked developing agents, color couplers and other materials which take part in the processing step may be in or adjacent to the emulsion layer(s) 3. Developing agents suitable for including in the coating, and a preferred way of incorporating them, are disclosed in U.S. Pat. No. 5,804,359.

The light sensitive layer is desirably one based on a silver halide emulsion of the type common in the art. The particular type of emulsion and development processing employed is not critical so any of the emulsion types and development processes available may be used. The emulsion is panchromatically sensitized so that it is sensitive to any color light that is transmitted by the nearby filter beads. The image is suitably formed by the developed silver using either a negative or reversal process.

The black-and-white photographic silver halide elements useful in the present invention are generally composed of a conventional flexible, transparent film support (polyester, cellulose acetate or polycarbonate) that has applied to each side one or more photographic silver halide emulsion layers. For some uses, it is conventional to use blue-tinted support materials to contribute to the blue-black image tone sought in fully processed films. Polyethylene terephthalate and polyethylene naphthalate are suitable film supports.

In general, such elements, emulsions, and layer compositions are described in many publications, including *Research Disclosure*, publication 36544, September 1994. *Research Disclosure* is a publication of Kenneth Mason Publications, Ltd., Dudley House, 12 North Street, Emsworth, Hampshire PO10 7DQ England.

The support can take the form of any conventional element support. Useful supports can be chosen from among those described in *Research Disclosure*, September 1996, Item 38957 XV. Supports and *Research Disclosure*, Vol. 184, August 1979, Item 18431, XII. Film Supports. They can be transparent or translucent polymeric film supports, or opaque cellulose papers or media. In its simplest possible form the film support consists of a material chosen to allow direct adhesion of the hydrophilic silver halide emulsion layers or other hydrophilic layers. More commonly, the support is itself hydrophobic and subbing layers are coated thereon to facilitate adhesion of the hydrophilic silver halide emulsion layers.

The photographic materials include one or more silver halide emulsion layers that comprise one or more types of silver halide grains responsive to suitable electromagnetic radiation. Such emulsions include silver halide grains composed of, for example, silver bromide, silver iodobromide, silver chlorobromide, silver iodochlorobromide, and silver chloroiodobromide, or any combinations thereof. The silver halide grains in each silver halide emulsion layer or unit can be the same or different, or mixtures of different types of grains.

The silver halide grains can have any desired morphology (for example, cubic, tabular, octahedral), or mixtures of grains of various morphologies. In some embodiments, at least 50% (sometimes at least 70%) of the silver halide grain projected area is provided by tabular grains having an average aspect ratio greater than 8, or greater than 12.

Imaging contrast can be raised by the incorporation of one or more contrast enhancing dopants. Rhodium, cadmium, lead and bismuth are all well known to increase contrast by restraining toe development. Rhodium is most commonly employed to increase contrast and is specifically preferred.

A variety of other dopants are known individually and in combination, to improve contrast as well as other common properties, such as speed and reciprocity characteristics. Dopants capable providing "shallow electron trapping" sites commonly referred to as SET dopants are specifically contemplated. SET dopants are described in Research Disclosure, Vol. 367, Nov. 1994, Item 36736. Iridium dopants are very commonly employed to decrease reciprocity failure. A summary of conventional dopants to improve speed, reciprocity and other imaging characteristics is provided by *Research Disclosure*, Item 36544, cited above, Section I. Emulsion grains and their preparation, sub-section D. Grain modifying conditions and adjustments, paragraphs (3), (4) and (5).

Low coefficient of variation (COV) emulsions can be selected from among those prepared by conventional batch double-jet precipitation techniques. A general summary of silver halide emulsions and their preparation is provided by *Research Disclosure*, Item 36544, cited above, Section I. Emulsion grains and their preparation. After precipitation and before chemical sensitization the emulsions can be washed by any convenient conventional technique using techniques disclosed by *Research Disclosure*, Item 36544, cited above, Section III. Emulsion washing.

The emulsions can be chemically sensitized by any convenient conventional technique as illustrated by *Research Disclosure*, Item 36544, Section IV. Sulfur and gold sensitization is specifically contemplated.

Instability which increases minimum density in negative-type emulsion coatings (i.e., fog) can be protected against by incorporation of stabilizers, antifoggants, antikinking agents, latent image stabilizers and similar addenda in the emulsion and contiguous layers prior to coating. Such addenda are illustrated by *Research Disclosure*, Item 36544, Section VII and Item 18431, Section II.

The silver halide emulsion and other layers forming the layers on the support contain conventional hydrophilic colloid vehicles (peptizers and binders) that are typically gelatin or a gelatin derivative (identified herein as "gelatino-vehicles"). Conventional gelatino-vehicles and related layer features are disclosed in *Research Disclosure*, Item 36544, Section II. Vehicles, vehicle extenders, vehicle-like addenda and vehicle related addenda. The emulsions themselves can contain peptizers of the type set out in Section II noted above, paragraph A. Gelatin and hydrophilic colloid peptizers. The hydrophilic colloid peptizers are also useful as binders and hence are commonly present in much higher concentrations than required to perform the peptizing function alone. The gelatino-vehicle extends also to materials that are not themselves useful as peptizers. The preferred gelatino-vehicles include alkali-treated gelatin, acid-treated gelatin or gelatin derivatives (such as acetylated gelatin and phthalated gelatin). Depending upon the use of the materials, the binder-containing layers can be hardened or unhardened.

Some photographic materials can include a surface overcoat on each side of the support that are typically provided for physical protection of the emulsion layers. In addition to vehicle features discussed above the overcoats can contain various addenda to modify the physical properties of the overcoats. Such addenda are illustrated by *Research Disclosure*, Item 36544, Section IX. Coating physical property modifying addenda, A. Coating aids, B. Plasticizers and lubricants, C. Antistats, and D. Matting agents. Interlayers that are typically thin hydrophilic colloid layers can be used to provide a separation between the emulsion layers and the surface overcoats. It is quite common to locate some emulsion compatible types of surface overcoat addenda, such as anti-matte particles, in the interlayers.

Processing the black and white element generally involves the steps of developing, fixing, washing, and drying. Processing can be carried out in any suitable processor or processing container for a given type of photographic element (for example, sheets, strips or rolls). The photographic material is generally bathed in the processing compositions for a suitable period of time.

The photographic developing composition includes at least one of the conventional developing agents utilized in black-and-white processing. Such developing agents include dihydroxybenzene developing agents, ascorbic acid developing agents, aminophenol developing agents, and 3-pyrazolidone developing agents. The dihydroxybenzene developing agents which can be employed in the developing compositions are well known and widely used in photographic processing. The preferred developing agent of this class is hydroquinone. Other useful dihydroxybenzene developing agents include: chlorohydroquinone, bromohydroquinone, isopropylhydroquinone, toluhydroquinone, methylhydroquinone, 2,3-dichlorohydroquinone, 2,5-dimethylhydroquinone, 2,3-dibromohydroquinone, 1,4-dihydroxy-2-acetophenone-2,4-dimethylhydroquino- ne 2,5-diethylhydroquinone, 2,5-di-p-phenethylhydroquinone, 2,5-dibenzoylaminohydroquinone, and 2,5-diacetaminohydroquinone. Ascorbic acid developing agents have also been utilized heretofore in a wide variety of photographic developing processes as shown in U.S. Pat. Nos. 2,688,548; 2,688,549; 3,022,168; 3,512,981; 3,870,479; 3,942,985; 4,168,977; 4,478,928; and 4,650,746. Developing compositions which utilize a primary developing agent, such as a dihydroxybenzene developing agent or an ascorbic acid developing agent, frequently also contain an auxiliary super-additive developing agent. Examples of useful auxiliary super-additive developing agents are aminophenols and 3-pyrazolidones. The auxiliary super-additive developing agents which can be employed in the developing compositions of are well-known and widely used in photographic processing.

In addition to one or more developing agents, the developing compositions usually also contain a sulfite preservative. By the term "sulfite preservative" as used herein is meant any sulfur compound that is capable of forming sulfite ions in aqueous alkaline solution. Examples of such compounds include alkali metal sulfites, alkali metal bisulfites, alkali metal metabisulfites, sulfurous acid and carbonyl-bisulfite adducts. Examples of preferred sulfites for use in the developing solutions of this invention include sodium sulfite, potassium sulfite, lithium sulfite, sodium bisulfite, potassium bisulfite, lithium bisulfite, sodium metabisulfite, potassium metabisulfite, and lithium metabisulfite. The carbonyl-bisulfite adducts are well-known compounds. Adducts of adehydes and adducts of ketones are useful and the adlehydes employed can be monoaldehydes, dialdehydes or trialdehydes and the ketones can be monoketones, diketones or triketones. The bisulfite adducts can be adducts of alkali metal bisulfites, alkaline earth metal bisulfites or nitrogen-base bisulfites such as amine bisulfites. Illustrative examples of the many carbonyl-bisulfite adducts which are useful in the present invention include the following compounds (all of those listed being sodium bisulfite adducts for the purpose of convenience in illustrating the invention, but it being understood that the compounds can also be employed in the form of adducts of other suitable bisulfites as explained herein-above): sodium formaldehyde bisulfite sodium acetaldehyde bisulfite sodium propionaldehyde bisulfite sodium butyraldehyde bisulfite succinaldehyde bis-sodium bisulfite glutaraldehyde bis-sodium bisulfite beta-methyl glutaraldehyde bis-sodium bisulfite maleic dialdehyde bis-sodium bisulfite sodium acetone bisulfite sodium butanone bisulfite sodium pentanone bisulfite 2,4-pentandione bis-sodium bisulfite, and the like. Alkaline agents whose functions is to control pH, such as carbonates, phosphates, amines or borates, are preferably also included in the developing compositions. The amount of primary developing agent incorporated in the working strength developing solution can vary widely as desired. Typically, amounts of from about 0.05 to about 1.0 moles per liter are useful. Typically, amounts in the range of from 0.1 to 0.5 moles per liter are employed. The amount of auxiliary super-additive developing agent utilized in the working strength developing solution can vary widely as desired. Usually, amounts of from about 0.001 to about 0.1 moles per liter are useful. Typically, amounts in the range of from 0.002 to 0.01 moles per liter are employed. The amount of sulfite preservative utilized in the working strength developing solution can vary widely as desired. Typically, amounts of from about 0.05 to about 1.0 moles per liter are useful. Amounts in the range of from 0.1 to 0.5 moles per liter are commonly employed. Working strength developing solutions prepared from the developing compositions of this invention typically have a pH in the range of from 8 to 13 and preferably in the range of from 9 to 11.5. Typically, the development temperature can be any temperature within a wide range as known by one skilled in the art, for example from about 15 to about 50° C.

A variety of other optional ingredients can also be advantageously included in the developing composition. For example, the developing composition can contain one or more antifoggants, antioxidants, sequestering agents, stabilizing agents or contrast-promoting agents. Examples of particularly useful contrast-promoting agents are amino compounds as described, for example, in U.S. Pat. No. 4,269,929. Examples of useful stabilizing agents are β-ketocarboxylic acids as described, for example, in U.S. Pat. No. 4,756,997.

In most processing methods, the developing step is generally followed by a fixing step using a photographic fixing composition containing a photographic fixing agent. While sulfite ion sometimes acts as a fixing agent, the fixing agents generally used are organic compounds such as thiosulfates (including sodium thiosulfate, ammonium thiosulfate, potassium thiosulfate and others readily known in the art), thiocyanates (such as sodium thiocyanate, potassium thiocyanate, ammonium thiocyanate, amines, halides and others readily known in the art (such as those described by Haist, *Modern Photographic Processing*, John Wiley & Sons, N.Y., 1979). Mixtures of one or more of these classes of photographic fixing agents can be used if desired. Thiosulfates and thiocyanates are preferred. In some embodiments, a mixture of a thiocyanate (such as sodium thiocyanate) and a thiosulfate (such as sodium thiosulfate) is used. In such mixtures, the molar ratio of a thiosulfate to a thiocyanate is from about 1:1 to about 1:10, and preferably from about 1:1 to about 1:2. The sodium salts of the fixing agents are preferred for environmental advantages.

The fixing composition can also include various addenda commonly employed therein, such as buffers, fixing accelerators, sequestering agents, swelling control agents, and stabilizing agents, each in conventional amounts. In its aqueous form, the fixing composition generally has a pH of at least 4, preferably at least 4.5, and generally less than 6, and preferably less than 5.5.

In processing black-and-white photographic materials, development and fixing are preferably, but not essentially, followed by a suitable washing step to remove silver salts dissolved by fixing and excess fixing agents, and to reduce swelling in the element. The wash solution can be water, but preferably the wash solution is acidic, and more preferably, the pH is 7 or less, and preferably from about 4.5 to about 7, as provided by a suitable chemical acid or buffer.

After washing, the processed elements may be dried for suitable times and temperatures, but in some instances the black-and-white images may be viewed in a wet condition.

Exposure and processing can be undertaken in any convenient conventional manner. Some exposure and processing techniques are described in U.S. Pat. Nos. 5,021,327; 5,576,156; 5,738,979, 5,866,309, 5,871,890, 5,935,770, and 5,942,378. Such processing can be carried out in any suitable processing equipment The final step in forming the image is to scan the image resulting form development processing and using an image enhancement algorithm to arrive at the final image. Conventional scanning techniques can be employed, including point-by-point, line-by-line and area scanning, and require no detailed description. A simple technique for scanning is to scan the photographically processed element point-by-point along a series of laterally offset parallel scan paths. The intensity of light received from or passing through the photographic element at a scanning point is noted by a sensor which converts radiation received into an electrical signal. The electrical signal is processed and sent to memory in a digital computer together with locant information required for pixel location within the image.

A convenient form of scanner can consist of a single multicolor image sensor or a single set of color sensors, with a light source placed on the opposite side of the film. Light transmitted through the film can give information on the image pattern in the emulsion layer(s) modulated by the color filter array.

Various methods of image processing may be employed. A relatively simple method is to represent the image data in a color model which has a luminance or lightness component and two chromatic or color components, such as the CIE L*a*b model. The chromatic components are then blurred with a suitable image filter to remove the higher frequency color information which arises largely from the color filter array, and the blurred chromatic information recombined with the original luminance information. The color saturation of the image may be varied by altering the contrast of the chromatic components. Other methods of image processing may be employed After image processing, the resulting representation of the scene recorded by the method of the invention may be viewed on a screen or printed by suitable means to give a printed photographic image.

The multilayered article of the invention is preferably prepared by coating and drying on the support the indicated layers in the desired sequence, as conventionally done in the manufacture of photographic film. Subbing layers and adhesive layers may be employed where appropriate.

In operation, the red portion of an image would be reproduced in the following manner using reversal processing and additive color beads of red, green, and blue, the formation of a red portion of the original would proceed as follows:

1. Red light is permitted to pass through (red) bead 6 and create a latent image on the light sensitive layer 2 of the film.

2. The resulting latent image is reversal developed so that there is no silver beneath the red bead but there is silver beneath other red beads where there is no red in the original image.

3. A red laser is used to scan the film and is transmitted through the film only where there is a red bead and no silver below it (i.e. where there is a red image in the original) and information on the location of the relevant red color areas is saved.

4. Image enhancement software is then used to provide the finished reproduction.

The invention is further illustrated by the following examples.

EXAMPLE 1

In this example we describe in detail our numerical simulation to produce random two-dimensional coatings of beads and to measure the resulting fluctuations in these coatings. We approximate the beads by spheres and we assume they are coated in a monolayer with no overlap. In this case, we can represent the beads by their cross-sectional area and thus this monolayer by a two-dimensional array of colored discs. The discs will be coated at a given area fraction and ratio of different bead colors in a two-dimensional square.

For our system of beads of sizes of 3 to 6 microns in diameter, we have chosen the square to be 500 microns on a side. As is common in performing these types of simulations, we have chosen to use periodic boundary conditions on the square in order to prevent artifacts associated with the edges of the simulated coating. The size of the system allows for quite good statistics and, to further improve our statistics, we have performed averages over 10 different simulated coatings when we have quantitatively analyzed the system.

An initial configuration of discs is chosen to be either a regular array or a configuration produced by a random insertion method. In the random insertion method, discs are put down one-by-one at random subject to the condition of no overlap with any other discs already put down. The advantage of the random-insertion method is that the configuration produced is much more random than a regular array (and thus needs fewer subsequent Monte Carlo randomization trials. However, the disadvantage is that there is a maximum area fraction (or "packing density") of discs that can be obtained via this method and, depending on the desired area fraction and on the size distribution of the discs, this maximum area fraction is sometimes less than the desired fraction. If this maximum fraction is only modestly less than the desired area fraction, a "trick" can sometimes be played whereby a small amount of overlap of the discs is allowed, with this overlap then be resolved in the subsequent Monte Carlo randomization trials.

Once this initial configuration has been obtained, it is randomized to produce the final simulated bead coating. This randomization is carried out by a standard Monte Carlo method. In this method, a disc is chosen at random and it is attempted to move this disc by a random amount in a random direction, represented by a vector chosen randomly from the area within a circle of some fixed radius $r_{max}$. This move is accepted provided the disc in question does not overlap any other disc following such a move; otherwise, it is rejected. The radius $r_{max}$ of the circle from which the vector is chosen represents the maximum distance that a disc might be moved in such a trial. The Monte Carlo algorithm is typically found to be most efficient at randomizing the system if this $r_{max}$ is chosen so that somewhere on the order of half the moves are accepted; we find that a radius of 0.2 or 0.25 times the largest disc diameter is typically sufficient to satisfy this rough criterion.

Each attempt to move one disc is considered to be one trial (or "step"). One must have a sufficient number of trials in order to produce a random distribution of discs (subject to the no-overlap constraint) from the initial configuration. The best way to insure that the number of trials is sufficient is to compare statistical measures of the simulated coating (such as the Wiener spectrum described below) for coatings which are started from different types of initial configurations (such as a regular array versus those produced by the random insertion method) or coatings produced from the same initial configurations but run for a very different number of Monte Carlo trials. We have typically used a number of trials equal to 3000 to 10000 times the number of beads in the coating and have verified in several cases that this is far more than sufficient to produce a random configuration.

To study the quality of our simulated bead coatings quantitatively, we employ standard techniques from the image science literature [J. C. Dainty and R. Shaw, Image Science: Principles, Analysis, and Evaluation of Photographic-type Imaging Processes, Academic Press, N.Y., 1974]. In particular, we define a circularly-averaged Wiener spectrum by first computing the full two-dimensional Wiener spectrum according to Dainty and Shaw, Chapter 6, Eq. (43) and then taking advantage of the isotropic nature of the system to circularly-average and obtain the spectrum as a function of one radial coordinate. We compute the Wiener spectrum for four different quantities; $W_R$, $W_G$, and $W_B$ correspond to the spectrum for red, green, and blue beads, respectively, whereas $W_{all}$ corresponds to the spectrum for all beads without respect to bead color. For $W_R$, we define the quantity $\Delta D(x,y)$ that appears in Dainty and Shaw, Chapter 6, Eq. (43) to be given by $D(x,y)-<D(x,y)>$ where $D(x,y)=1$ if a red bead covers the point (x,y) and $D(x,y)=0$ if it does not, and <. . .> denotes the average of this quantity over the two-dimensional space. $W_G$ and $W_B$ are computed in an analogous manner and $W_{all}$ is similar except that $D(x,y)=1$ if any color bead covers the point (x,y).

The plots of this entire Wiener spectrum shows the magnitude of the fluctuations as a function of the spatial frequency; however, the most important fluctuations are those at low enough spatial frequencies that these fluctuations occurring in the film will be detectable by the human eye in the final image. For this purpose, we adopt a measure analogous to a standard measure of granularity in color negative film. In particular, the granularity G measured through a circular aperture of radius r is related to the circularly-averaged Wiener spectrum W(ω) by $$G = \sqrt{2 \int_0^\infty W(\omega) \frac{J_1^2(2\pi r \omega)}{(\omega)} d\omega}$$

where $J_1(x)$ is the $1^{st}$-order Bessel function [see Dainty and Shaw, Chapter 8, Eq. (14)]. We take the aperture diameter to be 2r=48 microns. This measure is thus related to a weighted average of the Wiener spectrum with the weighting emphasizing those spatial frequencies below about 20 mm$^{-1}$.

It is emphasized that the resulting $G_R$, $G_G$, $G_B$, and $G_{all}$ measure those noise fluctuations for each of the different colored beads and for all the beads as a whole that are thought to be most relevant in determining the noise visible to a viewer of the final image obtained from the random CFA film. Although these are defined in analog to definitions of granularity, they are not direct measures of the granularity of the film itself. Nonetheless, they are expected to be rough correlates of this.

For our first numerical study we consider the effect on the noise fluctuations of taking a certain fraction of the beads (chosen irrespective of their color) and reducing them in size by a factor of two, from 6 microns to 3 microns. In each case, the total areal coverage of the beads is 60% and the ratio of red, green, and blue beads is R:G:B=42%:29.5%:28.5%. Table I below summarizes the results where the first column represents the fraction of the beads (by area fraction, not number of beads):

TABLE I

| % small by area fraction | | $G_R$ | $G_G$ | $G_B$ | $G_{all}$ |
|---|---|---|---|---|---|
| 0 | control | 1.91 | 1.80 | 1.76 | 0.80 |
| 2.7 | control | 1.92 | 1.81 | 1.76 | 0.81 |
| 9.7 | control | 1.91 | 1.72 | 1.70 | 0.80 |
| 27 | invention | 1.76 | 1.63 | 1.58 | 0.76 |
| 50 | invention | 1.63 | 1.41 | 1.46 | 0.74 |

The results show that with up to the 10% coverage fraction of small beads, there is little change in the noise. However, by 27% coverage, there is a small but significant decrease in the noise. By 50% coverage, the decrease in the noise is more dramatic. For a sense of scale here, it is useful to recall that a 5% increase in the value of G corresponds to one grain unit.

For our second numerical study we consider the effect on the noise fluctuations of reducing the size of all the beads of one or more colors by a factor of two, from 6 microns to 3 microns. In each case, the total areal coverage of the beads is ~60% and the areal coverage of the red, green, and blue beads is equal. Table II below summarizes the results:

TABLE II

| which color beads are small: | | $G_R$ | $G_G$ | $G_B$ | $G_{all}$ |
|---|---|---|---|---|---|
| none | control | 1.85 | 1.90 | 1.84 | 0.80 |
| R | invention | 0.88 | 1.69 | 1.51 | 0.70 |
| R, G | invention | 0.81 | 0.93 | 1.44 | 0.67 |
| all | invention | 0.92 | 0.94 | 0.92 | 0.38 |

These results illustrate how a reduction in the size of a given bead color by a factor of 2 results in a decrease of the noise fluctuations in the bead laydown for the beads of that color also by about a factor of 2. Moreover, there is a less pronounced, but still significant, decrease in the noise fluctuations for the other bead colors too. Thus, significant noise-reduction advantage can be gained by reducing the size of even one, and even more so two, of the three colors of beads.

In order to confirm that the decrease in noise fluctuations of the distribution of beads themselves translates into a decrease in the noise of the final image, we have taken samples of each of the above numerically-produced bead laydowns and have run them through a simulation of the exposure, processing, scanning, and printing of an ideal negative-working random CFA film. We assume a uniform exposure over the entire 500 micron by 500 micron coating. In this simulation, for example, exposure with red light results in development of silver under the red beads and no development anywhere else. The resulting negative thus looks black in regions where red beads are and is blue or green in regions where the blue or green beads are, respectively. The area between beads can be treated in various ways depending on one's assumptions regarding the existence and concentration of a nano-particulate dispersion, such as carbon black particles, in the binder between the beads. The scanning step is simulated by blurring this image over an appropriate distance, such as 12 microns; this represents the resolution of the scanning aperture. Finally, the color of the image is reversed in order to simulate the reversal step in producing the final print.

The above-described simulation is an idealized version of any experimental realization of a random CFA film in a variety of ways. For example, it assumes that the dyes in the beads are perfect "block" dyes, that the resolution of the light-sensitive layer is unlimited (i.e., the emulsion grains are very small), that the light is and remains perfectly-collimated, etc. Nonetheless, the results of these simulations show that decreases in the noise parameters $G_R$, $G_G$, $G_B$, and $G_{all}$ for the distribution of the beads do indeed correlate with decreases in the noise in the final image.

For further confirmation that the claims of our invention lead to a significant reduction in the noise, we have studied an experimental example of our random CFA film. This experimental example has also allowed us to relate the size of the beads to the size of the emulsion grains in the light-sensitive layer.

EXAMPLE 2

This example illustrates the effect of selectively reducing the size of one or more of the micro-filter elements (R, G, or B) on noise in a color print prepared by exposing a color filter array (CFA) scan film with said micro-filter elements to a scene, processing the exposed film, scanning the processed film using a suitable scanner to convert the image into an electronic form that can be stored and manipulated on a computer, enhancing color levels in the electronic form using image processing software such as Adobe Photoshop and then printing the final image using a suitable thermal or inkjet printer.

Preparation of Colored Beads or Micro-Filter Elements:

Red Beads 1 (RB1):

Twenty-five grams of a 47.6% w/w suspension of polystyrene beads prepared by limited coalescence (having mean diameter of 6 microns) was combined with 25 grams of distilled water and 5 grams of poly(vinyl alcohol) (75% hydrolyzed, molecular weight 3000) to constitute a diluted latex suspension. The "Limited Coalescence" process was described previously.

Dye 1 (0.5 grams), 0.5 grams of Neptun Yellow 075 from BASF Corporation, an organic soluble azo-dye with a spectral absorption maximum of 450 nm, in toluene and 0.225 grams of Sudan Orange 220 from BASF Corporation an organic soluble azo-dye with a spectral absorption maximum of 474 nm in toluene were dissolved in 0.5 grams of toluene and 49.5 grams of acetone. The diluted latex suspension was then added slowly (drop-wise) to this solution of the dyes while stirring to prepare a dyed latex suspension. The dyed latex suspension was then filtered using a porous cotton filter, poured into a dialysis bag (12,000 to 14,000 molecular weight cutoff) and washed with distilled water for one hour. After washing, the dyed latex suspension was filtered again using a porous cotton filter. The washed and filtered dyed latex suspension was centrifuged to provide a concentrated aqueous suspension of red colored polymer beads suitable for coating (15% w/w beads).

Blue Beads 1 (BB1):

Dye 2 (0.7 grams) and 0.55 grams of Dye 3 in were dissolved in 0.5 grams of toluene and 49.5 grams of acetone. The remainder of the preparation was similar to that of the red colored beads RB1.

Green Beads 1 (GB1):

Dye 3 (0.45 grams) and 0.495 grams of Neptun Yellow 075 were dissolved in 0.5 grams of toluene and 49.5 grams of acetone. The remainder of the preparation was similar to that of the red colored beads RB1.

Red Beads 2 (RB2):

Atlox 4991 (0.2 grams) from Uniqema, Wilmington Del. was combined with 10 grams of surfactant-free white polystyrene latex beads at a concentration of 8% w/w (mean diameter 3.1 microns, standard deviation of diameter 0.11 from Interfacial Dynamics Corporation, Portland, Oreg.; the size of the beads being just larger than the size of the largest emulsion grains).

Dye 1 (0.033 grams), 0.033 grams of Neptun Yellow 075 and 0.225 grams of Sudan Orange 220 were dissolved in 0.1 grams of toluene and 9.9 grams of acetone. The suspension of polystyrene beads containing Atlox was then added slowly to this solution of dyes. The dyed latex suspension was then filtered using a porous cotton filter, poured into a dialysis bag (12,000 to 14,000 molecular weight cutoff) and washed with distilled water for one hour. After washing, the dyed latex suspension was filtered again using a porous cotton filter. The washed and filtered dyed latex suspension was centrifuged to provide a concentrated aqueous suspension of red colored polymer beads suitable for coating (3% w/w beads).

Blue Beads 2 (BB2):

Dye 2 (0.037 grams) and 0.0.29 grams of Dye 3 were dissolved in 0.1 grams of toluene and 9.9 grams of acetone. The remainder of the preparation was similar to that of the red colored beads RB2.

Spectral analysis of the light transmission properties of the three colors of beads showed that each color of beads was sufficient to transmit light primarily in the desired color range.

CFA scan films comprising the above colored particles were prepared as follows:

The following black and white emulsion layers were first coated on a cellulose triacetate film support having a carbon anti-halation backing (coverages are in grams per meter squared, emulsion sizes as determined by the disc centrifuge method are reported in diameter×thickness in micrometers). Surfactants, coating aids and emulsion addenda were added as is common in the art.

Layer 1 (slow layer): a blend of three dyed (all with mixtures of SD-1 and SD-2) tabular silver iodobromide emulsions: (i) 1.30×0.12, 4.1 mole % I at 0.80 (ii) 0.66×0.12, 4.1 mole % I at 1.20 (iii) 0.55×0.08, 1.5 mole % I at 1.20; CHEM-1 at 1.50; and gelatin at 4.10.

Layer 2 (fast layer): a dyed (with a mixture of SD-1 and SD-2) tabular silver iodobromide emulsion 2.61×0.12, 3.7 mole % I at 1.40; CHEM-1 at 0.70; and gelatin at 1.80.

A sublayer or undercoat layer containing 1.08 g/m$^2$ of acid processed ossein gelatin was coated above the emulsion layers. The suspensions of colored beads were combined with lime processed ossein gelatin and an aqueous nanoparticulate dispersion of carbon black obtained by milling commercially available carbon black Black Pearls 880 from Cabot Corp. to a mean size below 100 nm using a conventional media mill with 50 micron polymeric beads and spread over the above emulsion layers to provide CFA films. The following films were made:

Film 1: (Control)

CFA layer containing 2.58 g/m$^2$ beads (equal parts of RB1, GB1, and BB1), 0.22 g/m$^2$ carbon black and 0.52 g/m$^2$ gelatin. An overcoat containing 1.08 g/m$^2$ gelatin was coated above the CFA layer.

Film 2: (Invention)

CFA layer containing 0.86 g/m2 of GB1, 0.43 g/m$^2$ RB2 and 0.43 g/m$^2$ BB2. The remainder of the layer composition was similar to that of Film 1.

Analysis of micrographs of the CFA in these two cases was carried out in a manner analogous to the analysis of the simulated coatings that was described in Example 1. The results for the measure of granularity are summarized in the table below and show the superior noise characteristics of the CFA of Film 2 in comparison to the CFA of Film 1. Note that, as in Example 1, the reduction in the noise of the bead distribution is greatest for those colors of beads whose size is reduced but that a reduction in the noise is also achieved for the green beads whose size is not reduced.

TABLE III

|  |  | $G_R$ | $G_G$ | $G_B$ | $G_{all}$ |
|---|---|---|---|---|---|
| Film 1 | control | 2.57 | 2.37 | 2.73 | 3.01 |
| Film 2 | invention | 1.71 | 2.16 | 1.89 | 2.36 |

The above films were exposed to a scene in a studio using a Minolta XG7 SLR camera. The films were then Black and White processed at 34.8° C. using developer of the following composition.

| | |
|---|---|
| Sodium carbonate | 25.1 g/L |
| Sodium sulfate | 5.0 g/L |
| Glycine | 25.1 g/L |
| MOP(4-hydroxymethyl-4methyl-1-phenyl-3pyrazolidinone) | 1.5 g/L |
| Sodium bromide | 1.0 g/L |

The exposed films were immersed in the developer for one minute followed by one minute in a 3% acetic acid stop bath, washed in running water for three minutes, and then immersed for five minutes in a C-41 fixer followed by a final wash for five minutes.

The processed negatives were scanned using a Kodak RFS3750 film scanner and then electronically color enhanced using Adobe Photoshop software version 5.0. Prints were then obtained from the color enhanced images using a Kodak Professional 8670 PS thermal printer.

A comparison of prints obtained from Film 1 (control) and Film 2 (invention) showed considerably reduced noise in the latter case.

The entire contents of the patents and other publications referred to in this specification are incorporated herein by reference.

PARTS LIST

| | |
|---|---|
| 1 | Support |
| 2 | Light Sensitive Layer |
| 3 | Under Layer |
| 4 | Color Filter Array (CFA) Layer |
| 5 | Protective Overcoat |
| 6 | Transparent Bead of First Color |
| 7 | Transparent Bead of Second Color |
| 8 | Transparent Bead of third Color |
| 9 | Water permeable Continuous Phase Transparent Binder |
| 10 | Neutral Nano-Particle |

What is claimed is:

1. An imaging element comprising a single layer containing a random distribution of a colored bead population of one or more colors coated above one or more layers comprising light sensitive silver halide emulsion grains, wherein the bead population comprises beads of at least one color in which at least 25% (based on projected area) of the beads of that color have an ECD less than 2 times the ECD of the silver halide grains in said one emulsion layer or in the fastest emulsion layer in the case of more than one emulsion layer.

2. The element of claim 1 wherein the bead population comprises beads of two or more colors.

3. The element of claim 2 wherein at least two of the bead colors comprise beads in which at least 25% (based on projected area) of the beads have an ECD less than 2 times the ECD of the silver halide grains in said one emulsion layer or in the fastest emulsion layer in the case of more than one emulsion layer.

4. The element of claim 3 wherein the beads comprise three colors and the three bead colors comprise beads in which at least 25% (based on projected area) of the beads have an ECD less than 2 times the ECD of the silver halide grains in said one emulsion layer or in the fastest emulsion layer in the case of more than one emulsion layer.

5. The element of claim 2 wherein the beads of all colors combined, in toto, comprise beads in which at least 25% (based on projected area) of the beads have an ECD less than 2 times the ECD of the silver halide grains in said one emulsion layer or in the fastest emulsion layer in the case of more than one emulsion layer.

6. The element of claim 1 in which at least 30% (based on projected area) of the beads of said at least one color have an ECD less than 2 times the ECD of the silver halide grains in said one emulsion layer or in the fastest emulsion layer in the case of more than one emulsion layer.

7. The element of claim 1 in which at least 50% (based on projected area) of the beads of said at least one color have an ECD less than 2 times the ECD of the silver halide grains in said one emulsion layer or in the fastest emulsion layer in the case of more than one emulsion layer.

8. The element of claim 1 in which the beads are green.

9. The element of claim 1 in which at least 50% (based on projected area) of the beads of said at least one color have an ECD of from 0.5 to 3 times the ECD of the silver halide grains in said one emulsion layer or in the fastest emulsion layer in the case of more than one emulsion layer.

10. The element of claim 9 in which at least 50% (based on projected area) of the beads of said at least one color have an ECD of from 1 to 2 times the ECD of the silver halide grains in said one emulsion layer or in the fastest emulsion layer in the case of more than one emulsion layer.

11. The element of claim 1 in which at least 75% (based on projected area) of the beads of said at least one color have an ECD of from 0.5 to 3 times the ECD of the silver halide grains in said one emulsion layer or in the fastest emulsion layer in the case of more than one emulsion layer.

12. The element of claim 1 in which the ECD of the silver halide grains either comprising said one layer or comprising the fastest layer of more than one layer is less than 3 micrometers.

13. The element of claim 1 comprising a support located on the side of the one or more layers of silver halide emulsion grains opposite from the layer containing the random distribution of colored beads.

14. The element of claim 1 comprising a support located between the one or more layers of silver halide emulsion grains and the layer containing the random distribution of colored beads.

15. The element of claim 1 wherein the light sensitive silver halide grains are not color sensitized.

16. The element of claim 1 wherein the bead containing layer exhibits not more than 20% overlap.

17. A process for forming an image comprising image-wise exposing the element of claim 1 and thereafter contacting the silver halide emulsion with a reducing agent to form an image.

18. The process of claim 17 wherein the image is scanned via color selective light transmission of the beads after development.

* * * * *